United States Patent
Larkin

[11] 3,785,776
[45] Jan. 15, 1974

[54] APPARATUS FOR CONTINUOUS LIQUID PHASE SEPARATION

[75] Inventor: Barrymore T. Larkin, Middlesex Township, Butler County, Pa.

[73] Assignee: Koppers Company, Inc., Pittsburgh, Pa.

[22] Filed: Jan. 17, 1972

[21] Appl. No.: 218,252

[52] U.S. Cl. .............. 23/267 R, 202/158, 202/200, 23/283
[51] Int. Cl. .......................... B01d 11/04, B01d 3/22
[58] Field of Search .................. 23/267, 270.5, 270, 23/271, 309, 310, 311, 283, 284, 306, 307, 23/275, 276; 202/158, 200

[56] References Cited
UNITED STATES PATENTS

| | | | |
|---|---|---|---|
| 1,780,977 | 11/1930 | Leslie | 202/158 |
| 3,082,259 | 3/1963 | Bauer | 23/270.5 |
| 1,730,891 | 10/1929 | Leslie | 202/158 |
| 2,493,265 | 1/1950 | Scheibel | 23/270.5 |
| 2,552,517 | 5/1951 | Christensen | 202/158 |
| 2,678,199 | 5/1954 | Koch | 202/158 |
| 1,962,153 | 6/1934 | Peterkin | 202/200 |

Primary Examiner—Norman Yudkoff
Assistant Examiner—S. J. Emery
Attorney—Arland T. Stein et al.

[57] ABSTRACT

An apparaus for continuous liquid phase separation, particularly of meta and para cresol, having a desulfonation column in which a plurality of fixed beds are positioned along its length and separated by plenums. Alternative plenums are connected to a source of steam and the plenums not so connected are connected with vapor withdrawal means. A sulfonator is provided to supply feedstock to the column at its top and thin film evaporator provided to concentrate sulfuric acid produced in the column for reuse in the sulfonator. The withdrawal means including condensing means for the separation of water from the volatilized fractions.

4 Claims, 1 Drawing Figure

PATENTED JAN 15 1974  3,785,776
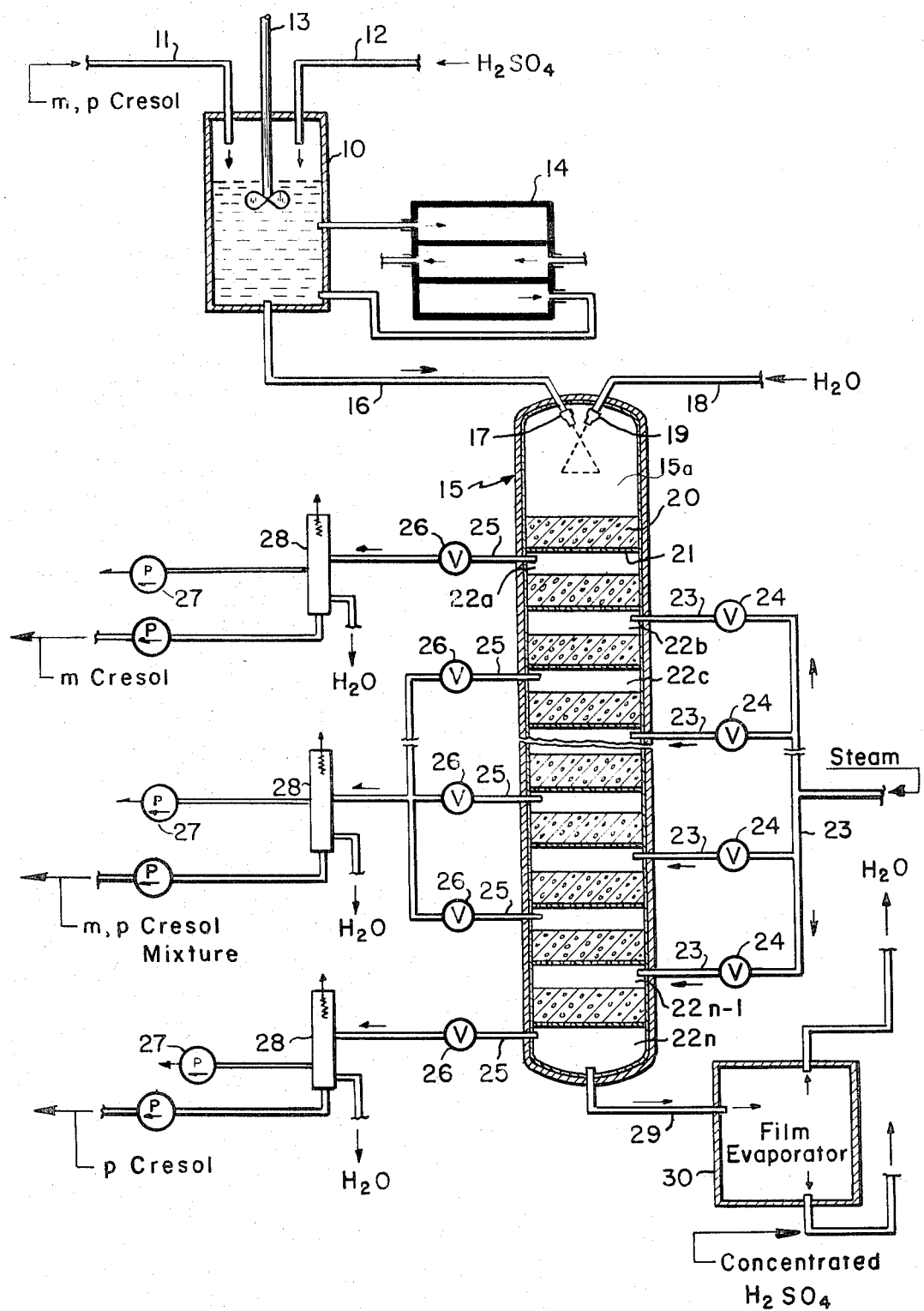

3,785,776

APPARATUS FOR CONTINUOUS LIQUID PHASE SEPARATION

FIELD OF THE INVENTION

The present invention relates to an apparatus for continuous liquid phase separation. The invention, in particular, is addressed to apparatus and process for continuously separating m- and p-cresols from mixtures thereof by sulfonation-desulfonation and steam distillation.

BACKGROUND OF THE INVENTION

Commercial cresols are coal tar derivatives that occur as isomers — ortho, para and meta. The boiling point of o-cresol is approximately 190°C., whereas the boiling points of m- and p-cresol are about equal to each other, namely 202.8° and 202.5°C., respectively. Thus, substantially pure quantities of o-cresol can be obtained by distillation of the isomeric mixtures. The meta and para fractions are not, however, easily separated because of their essentially identical boiling points. These isomers remain, usually in a ratio of 2:1 meta- to para-cresol.

Separation of these cresols usually requires chemical as well as physical means, and the processes for carrying out such separations are generally well understood. For example, the meta and para fractions are sulfonated with sulfuric acid to form their respective sulfonic acids. The m-cresol sulfonic acid is decomposed by steam at 125°C.; the m-cresol distills off and p-cresol sulfonic acid remains behind undecomposed, United States Pat. No. 656,263. Mixtures of the meta and para cresols can be selectively sulfonated with sulfuric anhydride and separated by distillation in vacuum in the presence of steam, United States Pat. No. 1,364,547. The processes utilize the temperature differential between the m- and p-cresol sulfonic acid hydrolyzation temperature or the solubility differentials of m- and p-cresols to effectuate separation.

While the chemistry of separation by desulfonation is understood, means for carrying it out in high purity and quantities has not been accomplished. The present invention provides a means for preparing high quantity and purity meta and para cresols.

SUMMARY OF THE INVENTION

The present invention is addressed to the continuous separation of meta and para cresols. The continuous separation can be carried out economically and without the production of unwanted byproducts. Sulfuric acid utilized in the sulfonation of the cresols is reconcentrated for reuse. The aqueous condensates can be dephenolated for reuse as boiler feedstock.

Generally, the apparatus of the present invention includes a sulfonator into which is fed concentrated sulfuric acid and a mixture of meta and para cresol. The sulfonator comprises means for continuously agitating and heating and/or cooling the mixture to provide complete sulfonation. Residence time of the mixture is approximately 1 hour.

A desulfonation column is provided into which the sulfonated mixture is fed. The sulfonated mixture of cresols is diluted with water at the feed point by means of sprays. The column comprises a plurality of beds each of which is supported by a porous plate. Each of the beds is separated by a plenum. Steam is fed to the column to provide the desired hydrolyzation temperature for the separation of the diluted sulfonated cresols. Preferably, the steam is injected into alternating plenums and the hydrolyzed cresol product is withdrawn in the vaporized state above each bed from the remaining plenums. The temperature of the beds vary along the length of the column such that m-cresol is volatilized at the top of the column and p-cresol at the bottom. Between the top and bottom of the column mixtures of the m- and p-cresols are withdrawn.

The volatilized cresols are condensed and the water separated therefrom. The mixture of m- and p-cresols from the center of the column are recycled back to the sulfonator, if desired.

As the sulfonated solution proceeds through the plurality of beds, sulfur trioxide is formed which combines with the steam to form dilute sulfuric acid. The sulfuric acid is withdrawn at the bottom of the column and fed to an evaporator for concentration and reuse.

Accordingly, the apparatus provides a means for the continuous separation of m-, p-cresols. Other advantages may be seen from a perusal of the following preferred embodiments.

BRIEF DESCRIPTION OF THE DRAWING

The drawing is a diagrammatic view of a presently preferred embodiment of the apparatus for continuous separation of m-, p-cresols including a sulfonator, desulfonation column and evaporator.

DESCRIPTION OF THE PRESENTLY PREFERRED EMBODIMENT

Referring to the drawing, the system includes a sulfonator 10 to which is fed a mixture of m-, p-cresols and concentrated sulfuric acid, preferably concentrated sulfuric acid — 96 percent, by lines 11 and 12, respectively. Sulfonator 10 includes an agitator 13. While sulfonator 10 may be constructed from carbon steel or cast iron it is preferable to fabricate it from stainless because maintenance costs are reduced.

The temperature of sulfonation is controlled at between 100°–150°C. It may be necessary, however, to utilize cooling means to maintain the temperature due to high heat generated by the sulfonation reaction. This could be accomplished by providing the sulfonator with a cooling jacket or by circulating the reaction mixture from the sulfonator through a heat exchanger 14 back to the sulfonator. Residence time within sulfonator 10 is about one hour to assure complete sulfonation.

The sulfonated cresols are discharged from sulfonator 10 and fed to the inlet chamber 15a of desulfonation column 15 by line 16. The sulfonated cresols are preferably fed to chamber 15a through spray head 17. The cresols are diluted with water fed to chamber 15a by line 18 and sprayed into the cresol spray by spray head 19. While other means for diluting the sulfonated cresol are available, spray provides a very effective dilution. It is preferable that the ratio of water to sulfonated cresols be approximately 2:1. Thus, the spray heads should be positioned in such a way as to obtain the most effective dilution of the incoming sulfonated cresols.

Column 15 is preferably fabricated from steels having a bonded glass liner. Plastic liners and the like are not well suited for use in the present invention because of the high temperatures necessary for the separation of p-cresol. Column 15 comprises a plurality of fixed beds 20 supported by permeable plates 21. Between adjacent beds 20 are plenums 22a–n. The number of beds is not critical, but for satisfactory operation it is preferable to have more than three or four.

Beds 20 are preferably of a ceramic packing material such as glazed or unglazed porcelain. The type of packings suitable for use in the present invention include berl saddles, spiral ring, cross-partition rings, raschig rings and the like. The purpose of the packing is to create sufficient residence time within each temperature zone to effectuate hydrolysis and volatilization of the sulfonation stream. The permeable support plates 21 may be made of any suitable material as for example bonded glass steel having openings therein or a permeable ceramic material.

Plenums 22a–n are provided for injecting steam into column 15 from lines 23 connected to a steam generator (not shown). Alternatively, steam could be injected directly into the fixed beds, but such an arrangement would necessitate the use of an elaborate distribution system, and is, therefore, not preferred. Lines 23 include metering valves 24 to control the amount of steam entering each plenum to provide a means for selectively establishing temperatures along the length of the column.

Preferably, steam is fed into alternative plenums, for example plenums 22b, 22d. . .22n–l. Steam could also be injected into inlet chamber 15a, but this is not deemed necessary. Plenums 22a, 22c. . .22n are provided with vapor withdrawal lines or outlet lines 25. By arranging the outlet and inlet lines 25 and 23, respectively, to different plenums, the steam is pulled through the beds contiguous to the inlet. Accordingly, fairly precise temperature zones can be maintained within column 15.

Lines 25 include metering valves 26 to regulate the amount of draw or suction established on each outlet line. Pumps 27 as well as valves 26 are utilized to maintain a negative pressure in the system to lower hydrolysis temperature and increase m-cresol purity and to expedite withdrawal of all of the volatilized fractions.

While a number of pumps 27 have been shown, it is clear that only one pump 27 would be necessary and would be common to all of the condensers 28 that were utilized. Also, pumps 27 could be inserted into line 25 between valves 26 and condensers 28, but this arrangement is not preferred.

The temperature of the uppermost bed is maintained at about 100°–120°C. In this temperature range the sulfonated m- cresol is preferentially hydrolyzed and volatilized and is withdrawn from plenum 22a. The negative pressure as well as the steam pressure draws the steam through the beds, heating them to the desired temperature. The temperature of the solution as it enters the column is adjusted or controlled by the temperatures and volume ratio of the two inlet streams.

Volatilized para-cresol is withdrawn from the bottommost plenum 22n, and the beds immediately above plenum 22n are maintained at a temperature of about 170°–180°C. The fractions withdrawn from plenums 22c – 22n-2 contain various mixtures of m- and p-cresols. Since these mixtures have no significant value beyond commerical m-, p-cresol mixtures, they can be used as additional feedstock and are recycled after separation from the water to sulfonator 10. However, if various percentage mixtures are desired, each of these fractions can be separately condensed. Since it is not usually necessary to separate numerous mixture fractions, the number of beds would not be as great and a common pump 27, as shown, could be effectively utilized.

The volatilized fractions are condensed in condensers 28 and the water and cresols separated by liquid phase separation. Preferably three condensers 28 are used; one for each of the substantially pure fractions of m- and p-cresol and at least one for the mixtures of cresols. After separation, the mixtures of cresols can be recycled to the sulfonator for resulfonation. If desired, pumps may be used to withdraw the various fractions from the condensers 28.

At the bottom of plenum 22n, water and sulfuric acid are collected and fed by line 29 to evaporator 30 for reconcentrating the sulfuric acid and removing water. The concentration of the sulfuric acid collected at plenum 22n depends in large part upon the amount of water fed to column 15 through line 18. Since it is preferable to utilize an excess of water to sulfonated cresol, greater than three times cresol by weight, to hydrolyze the sulfonated cresols, the cresol-stripped acid would be dilute, that is, less than 75 percent concentration. Accordingly, a two stage evaporation would be desirable. The dilute acid could be concentrated to above 75 percent in a Burke-Mantius evaporator or the like in the first stage and then concentrated to approximately 96 percent in the second stage by a falling film evaporator or submerged combustion unit. If the acid is already greater than 75 percent, only the second stage is necessary.

The reconstituted acid is recycled to the sulfonator for reuse. The water separated by evaporator 30 and condensers 28 can be recycled to spray head 17 in column 15 or dephenolated and used as boiler feedstock.

Accordingly, it is clear that the apparatus and method employed thereby produce very little if any waste. Economical and ultimately quantitative production of both meta- and para-cresols are accomplished.

While the apparatus has been particularly described with reference to m-, p-cresols, the same separation problem exists with respect to 2,4 xylenol and 2,5 xylenol, both of which have a boiling point of 211°C. The hydrolysis temperatures for their respective monosulfonic acids are 121-125 and 115°–118°C. Thus, it is clear that these xylenols could be separated using the apparatus of the present invention adjusted for temperature.

The following table is an example of the desulfonation according to the present invention.

TABLE

Desulfonation of Sulfonated m, p-Cresols

| Distillation Fraction | Distillation Conditions | | | Percent of Charged Cresols[1] | Cut Composition, Wt. %[2] | |
|---|---|---|---|---|---|---|
| | Temp. (°C.) | Pressure (mm. Hg) | Other | | m-Cresol | p-Cresol |
| 1 | 118 | ca. 760 | Steam sparge | 10.4 | 91 | 9 |
| 2 | 118 | | | 11.5 | 90 | 10 |
| 3 | 118–119 | | | 10.6 | 92 | 8 |
| 4 | 119–120 | | | 10.7 | 91 | 9 |

TABLE—Continued

Desulfonation of Sulfonated m, p-Cresols

| Distillation Fraction | Distillation Conditions | | | Percent of Charged Cresols[1] | Cut Composition, Wt. %[2] | |
| --- | --- | --- | --- | --- | --- | --- |
| | Temp. (°C.) | Pressure (mm. Hg) | Other | | m-Cresol | p-Cresol |
| 5  | 120–118 |       |              | 8.3  | 84 | 16 |
| 6  | 118     |       |              | 6.6  | 81 | 19 |
| 7  | 118–119 |       |              | 3.9  | 77 | 23 |
| 8  | 120     |       |              | 1.8  | 73 | 27 |
| 9  | 120–122 |       | End of steam | 2.1  | 66 | 34 |
| 10 | 122–132 |       |              | 5.1  | 37 | 63 |
| 11 | 132–151 |       |              | 12.9 | 5  | 87 |
| 12 | 151–170 |       |              | 3.7  | 8  | 84 |
| 13 | 96–150  | 760–9 | Vacuum dist. | 0.5  | 12 | 81 |

[1] Charged 300.0 g. of 66/34 m, p-cresol. Recovery = 88%, (one pass).
[2] Analysis by infrared spectrometry. Corrected for any residual solvent.

While a presently preferred embodiment of the invention has been shown and described, it may otherwise be embodied within the scope of the appended claims.

What is claimed is:

1. An apparatus for continuous liquid phase separation comprising:
   A. a sulfonator for the sulfonation of a feedstock; and
   B. a vertical column including
      i. an inlet located at the top connected to said sulfonator for introducing a stream of sulfonated feedstock into the top of said column,
      ii. inlet means for directing a diluent into said sulfonated stream in the top of said column,
      iii. a plurality of vertically spaced apart beds including packing material, adjacent beds defining open chambers there between,
      iv. means for introducing steam into alternate open chambers between said packing beds,
      v. means for withdrawing volatized fractions from said other open chambers spaces, including at least a pair of condensing means connected to different ones of said withdrawing means, and
      vi. a discharge outlet at the bottom of said column.

2. An apparatus as set forth in claim 1 wherein said packing beds include a ceramic packing material supported by a permeable plate.

3. An apparatus for the continuous separation of meta and para cresols comprising:
   A. a means for sulfonating m- and p-cresols; and
   B. a desulfonation column including
      i. an inlet connected to said sulfonating means for introduction of a stream of sulfonated cresols into the top of said column,
      ii. means for directing a diluent into said stream in the top of said column,
      iii. a plurality of vertically spaced apart packing beds including ceramic packing material, adjacent beds defining open chambers there between,
      iv. means for introducing steam into alternate chambers between said beds,
      v. means for withdrawing volatized fractions connected to said other chambers and including first and second condensing means associated with the upper and bottom spaces to which said withdrawal means are associated, respectively, and
      vi. a discharge outlet at the bottom of said column.

4. An apparatus set forth in claim 3 wherein a means for concentrating sulfuric acid formed in said column is connected to said discharge outlet.

* * * * *

UNITED STATES PATENT OFFICE
CERTIFICATE OF CORRECTION

Patent No. 3,785,776     Dated January 15, 1974

Inventor(s) Barrymore T. Larkin

It is certified that error appears in the above-identified patent and that said Letters Patent are hereby corrected as shown below:

Column 5, line 39, the word "spaces" should be deleted;

Column 6, line 41, the word "as" should be inserted after "apparatus".

Signed and sealed this 11th day of June 1974.

(SEAL)
Attest:

EDWARD M. FLETCHER, JR.
Attesting Officer

C. MARSHALL DANN
Commissioner of Patents